(12) United States Patent
Jung et al.

(10) Patent No.: US 9,041,732 B2
(45) Date of Patent: May 26, 2015

(54) APPARATUS AND METHOD FOR CLIPPING FOR 3D GRAPHIC RENDERING

(75) Inventors: Seok Yoon Jung, Seoul (KR); Sang Oak Woo, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 13/331,788

(22) Filed: Dec. 20, 2011

(65) Prior Publication Data
US 2012/0154391 A1    Jun. 21, 2012

(30) Foreign Application Priority Data

Dec. 21, 2010 (KR) .................. 10-2010-0131768

(51) Int. Cl.
*G09G 5/00* (2006.01)
*G06T 15/30* (2011.01)

(52) U.S. Cl.
CPC ...................... *G06T 15/30* (2013.01)

(58) Field of Classification Search
CPC .................. G06T 15/30; G06T 15/20
See application file for complete search history.

(56) References Cited

U.S. PATENT DOCUMENTS 7,292,242 B1 * 11/2007 Wittenbrink et al. ......... 345/421
2008/0094412 A1 * 4/2008 Jiao et al. ..................... 345/621

OTHER PUBLICATIONS

"Displace," Retrieved Mar. 11, 2014, dictionary.reference.com/browse/displace.*

* cited by examiner

*Primary Examiner* — Kee M Tung
*Assistant Examiner* — Nicholas R Wilson
(74) *Attorney, Agent, or Firm* — NSIP Law

(57) ABSTRACT

Provided are a clipping apparatus and clipping method for a three-dimensional (3D) graphic rendering. The clipping apparatus may reset or convert a triangular object based on distance information of vertices configuring or comprising the triangular object where a perspective projection scheme is applied.

16 Claims, 7 Drawing Sheets

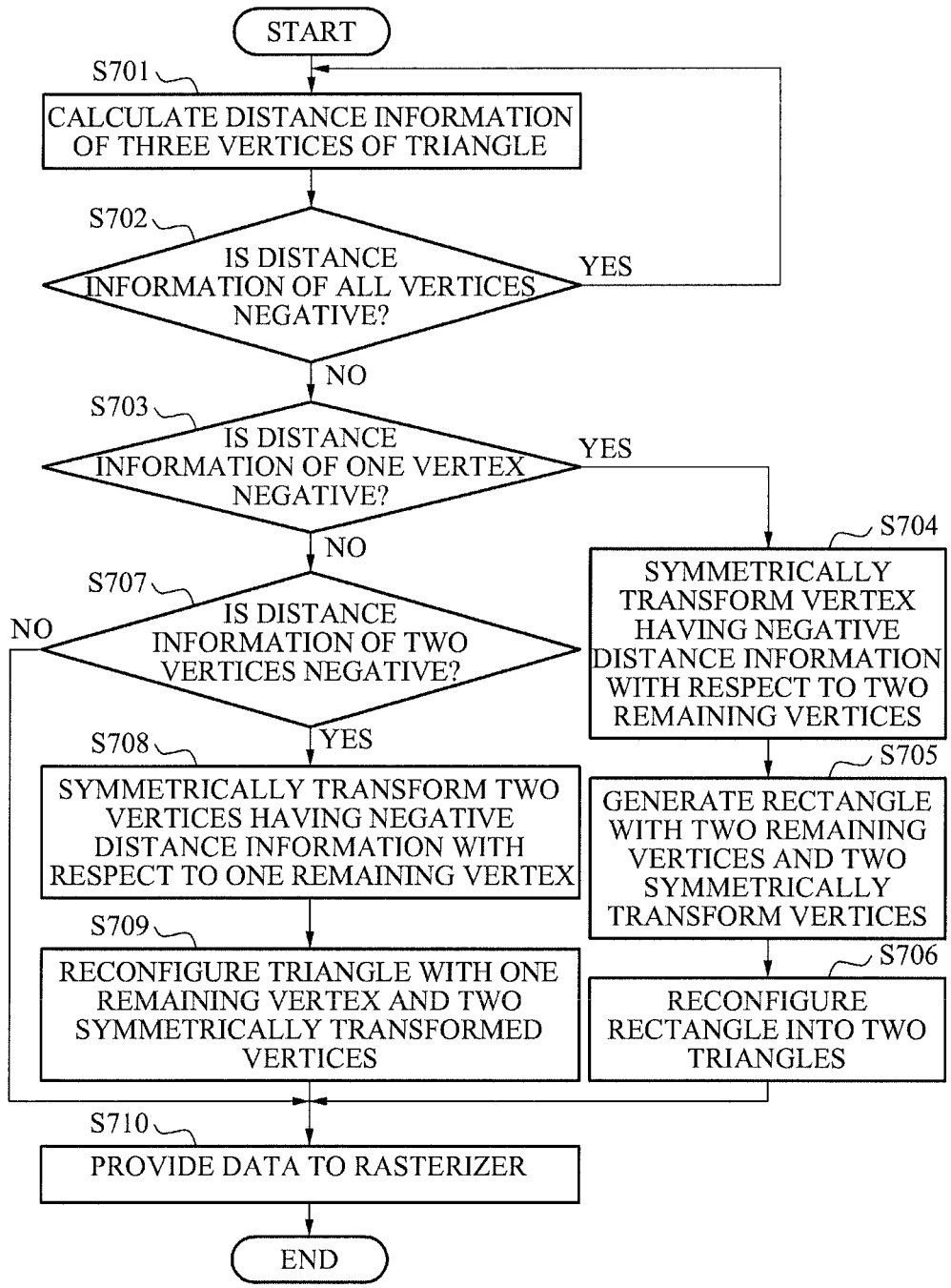

APPARATUS AND METHOD FOR CLIPPING FOR 3D GRAPHIC RENDERING

CROSS-REFERENCE TO RELATED APPLICATIONS

This application claims the priority benefit of Korean Patent Application No. 10-2010-0131768, filed on Dec. 21, 2010, in the Korean Intellectual Property Office, the disclosure of which is incorporated herein by reference.

BACKGROUND

1. Field

Example embodiments relate to an apparatus and method for a clipping for a three-dimensional (3D) graphic rendering and, more particularly, to an apparatus and method for resetting a triangular object based on distance information of a vertex configuring the triangular object where a perspective projection scheme is applied.

2. Description of the Related Art

With recent developments in a three-dimensional (3D) graphic rendering technology, a relatively more accurate graphic rendering scheme is required. A perspective projection scheme may be applied to a graphic region such as a 3D animation and simulation. The perspective projection scheme may project a 3D object onto a two-dimensional (2D) plane. When the perspective projection scheme is applied, an object placed at a location relatively close to a viewpoint may be recognized to be relatively larger, and an object placed at a location relatively far from the viewpoint may be recognized to be relatively smaller.

In a case where the perspective projection scheme is applied, an object placed at a location other than within a view-frustum of a perspective projection may cause a redundant processing burden in a 3D graphic rendering process and, in particular, an object placed at a rear position of the viewpoint may cause an inaccurate result. Thus, an object placed across a view-frustum boundary may use a clipping or cutting of a portion placed within the view-frustum as a preprocessing. However, the clipping may change a data structure of a 3D object, and an arithmetic operation process after the clipping may become significantly complex.

Accordingly, a scheme may be used to exclude an additional arithmetic operation process while deriving a relatively accurate 3D graphic rendering result.

SUMMARY

The foregoing and/or other aspects are achieved by providing a clipping apparatus for resetting a triangular object for a three-dimensional (3D) graphic rendering, the apparatus including a distance information calculating unit to calculate distance information of each vertex configuring the triangular object, a vertex transforming unit to transform a vertex of the triangular object based on a status indication of the distance information, and a triangle resetting unit to reset the triangular object based on the transformed vertex.

The foregoing and/or other aspects are achieved by providing a clipping method for resetting a triangular object for a 3D graphic rendering, the method including calculating distance information at each vertex configuring the triangular object, transforming a vertex of the triangular object based on a status indication of the distance information, and resetting or converting the triangular object based on the transformed vertex.

According to an embodiment, a data structure of a triangular object generated by a clipping process may be prevented from being changed.

According to an embodiment, by performing a clipping based on a status indication of distance information of a vertex configuring a triangular object where a perspective projection scheme is applied, an additional arithmetic operation by a clipping process may not be used and a speed of a 3D graphic rendering may be improved.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 7 illustrates a clipping method according to example embodiments.

DETAILED DESCRIPTION

Figure 1:
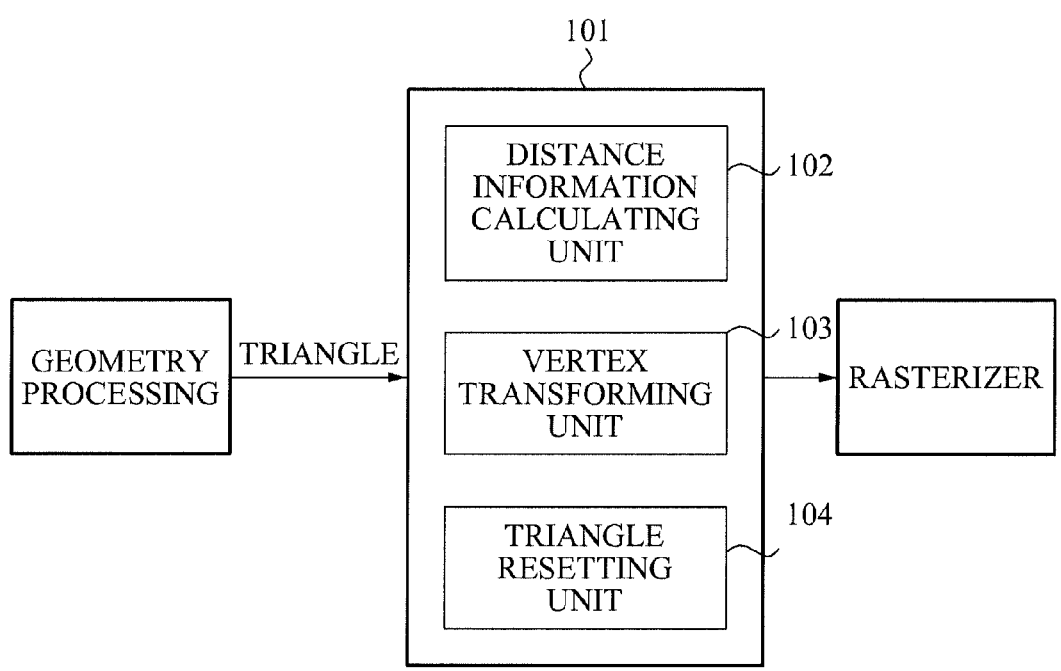
FIG. 1 illustrates a clipping apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a clipping apparatus 101 according to example embodiments.

Referring to FIG. 1, the clipping apparatus 101 may be a computer and may include a distance information calculating unit 102, a vertex transforming unit 103, and a triangle resetting or converting unit 104.

The distance information calculating unit 102 may calculate distance information of each vertex with respect to a triangular object generated through a geometric processing. In this instance, the distance information calculating unit 102 may calculate distance information from a viewpoint with respect to each of three vertices of a triangular object where a perspective projection scheme is applied. The perspective projection scheme will be further described with reference to FIG. 2 through FIG. 4.

The vertex transforming unit 103 may transform a vertex of the triangular object based on a status indication of the distance information of each vertex with respect to the triangular object. Here, a case where a status indication sign of the distance information of each vertex indicates a positive value, may be defined to correspond to a vertex placed, in a frontal position of a viewpoint, in a viewpoint direction, and a case where a status indication sign of the distance information of each vertex indicates a negative value, may be defined to correspond to a vertex placed, in a rear position of the viewpoint, in the viewpoint direction.

As an example, in a case where distance information of one vertex among three vertices configuring the triangular object corresponds to a negative value, the vertex transforming unit 103 may symmetrically transform the vertex, having the negative distance information with respect to two remaining vertices, to generate two transformed vertices. As another example, in a case where distance information of two vertices among three vertices configuring the triangular object corresponds to a negative value, the vertex transforming unit 103 may symmetrically transform the two vertices, having the negative distance information with respect to one remaining vertex, to generate two transformed vertices. A process of transforming a vertex of a triangular object will be further described with reference to FIG. 5 and FIG. 6.

The triangle resetting unit 104 may reset the triangular object based on a vertex transformed by the vertex transforming unit 103. A process of resetting a triangular object will be further described with reference to FIG. 5 and FIG. 6.

Figure 2:
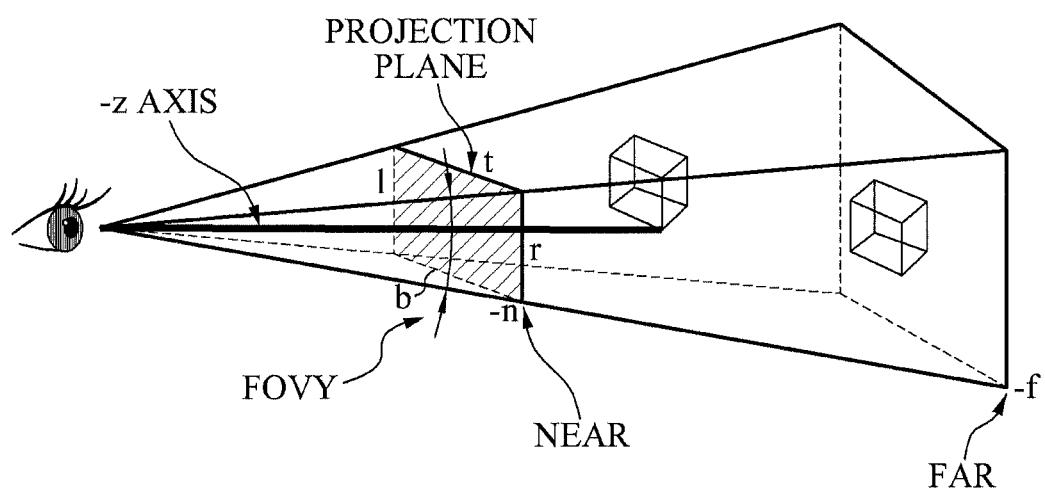
FIG. 2 illustrates a perspective projection scheme according to example embodiments.

FIG. 2 illustrates a perspective projection scheme according to example embodiments.

For a 3D graphic rendering, an object present in a 3D space may be a perspective projection onto a 2D plane. A perspective projection may correspond to a scheme of projecting an object to be practically recognized by a viewer, and an object placed at a location relatively far from a viewpoint of the viewer may be recognized to be relatively smaller.

For example, the perspective projection may be performed according to the following Equation 1.

$$\begin{Bmatrix} x_d \\ y_d \\ z_d \end{Bmatrix} = \begin{pmatrix} \frac{-2n}{r-l}\frac{x_e}{z_e} - \frac{r+l}{r-l} \\ \frac{-2n}{t-b}\frac{y_e}{z_e} - \frac{t+b}{t-b} \\ \frac{2fn}{f-n}\frac{1}{z_e} + \frac{f+n}{f-n} \end{pmatrix}$$ [Equation 1]

$$w_d = -z_e$$

Here, $x_d$ and $y_d$ indicate a location on the 2D plane after the perspective projection, and $z_d$ and $w_d$ indicate depth information used for the 3D graphic rendering. $z_d$ indicates information associated with a distance from the viewpoint, and $w_d$ indicates distance information from the viewpoint. $x_e$, $y_e$, and $z_e$ indicate a location in the 3D space before the perspective projection. "r" indicates a right side based on the viewpoint, "l" indicates a left side based on the viewpoint, "t" indicates a upper limit based on the viewpoint, and "b" indicates a lower limit based on the viewpoint.

When the perspective projection is applied according to Equation 1, $1/z_e$ included in Equation 1 may cause an inaccurate location value ($x_d$, $y_d$, $z_d$) to be derived for a case of $z_d>0$, that is, with respect to a vertex located in a rear side of the viewpoint in the viewpoint direction. Thus, as illustrated in FIG. 1, for an accurate 3D graphic rendering, a clipping may be used for a preprocessing of cutting and eliminating a portion placed out of a view-frustum configured by location values r, l, t, and b of the 3D object.

According to an embodiment, by performing the clipping after the perspective projection scheme is applied, a data structure of a triangular object may not be changed due to a clipping process, and an additional arithmetic operation used for a data processing after the clipping process may not be performed.

Figure 3:
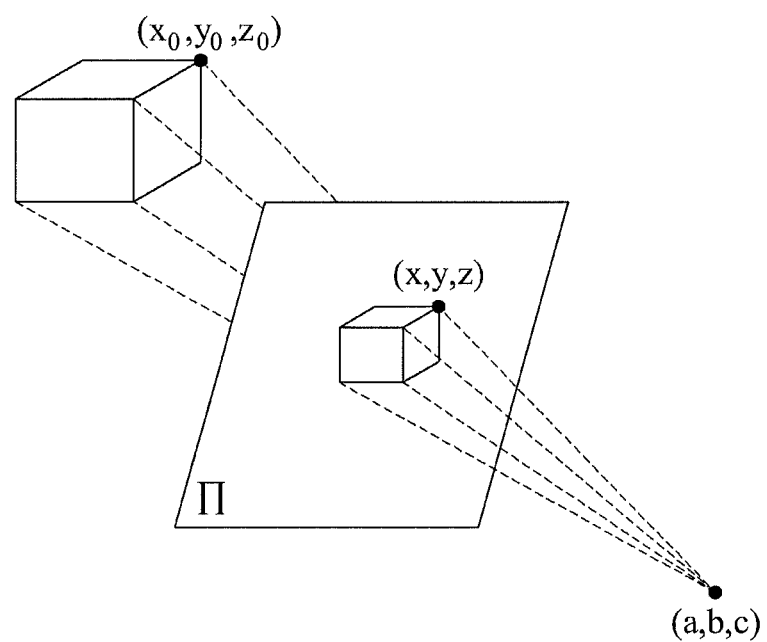
FIG. 3 illustrates an example of perspective projection of a three-dimensional (3D) object onto a two-dimensional (2D) plane according to example embodiments.

FIG. 3 illustrates an example of a perspective projection a 3D object onto a 2D plane according to example embodiments.

Referring to FIG. 3, illustrated is the 3D object, a perspective projection onto the 2D plane π based on a viewpoint (a, b, c). According to a perspective projection scheme, an object placed at a location relatively close to a viewpoint may be recognized to be relatively larger, and an object placed at a location relatively far from a viewpoint may be recognized to be relatively smaller. The perspective projection scheme may be generally used for a 3D graphic processing such as, a 3D animation and simulation requiring realism.

Figure 4:
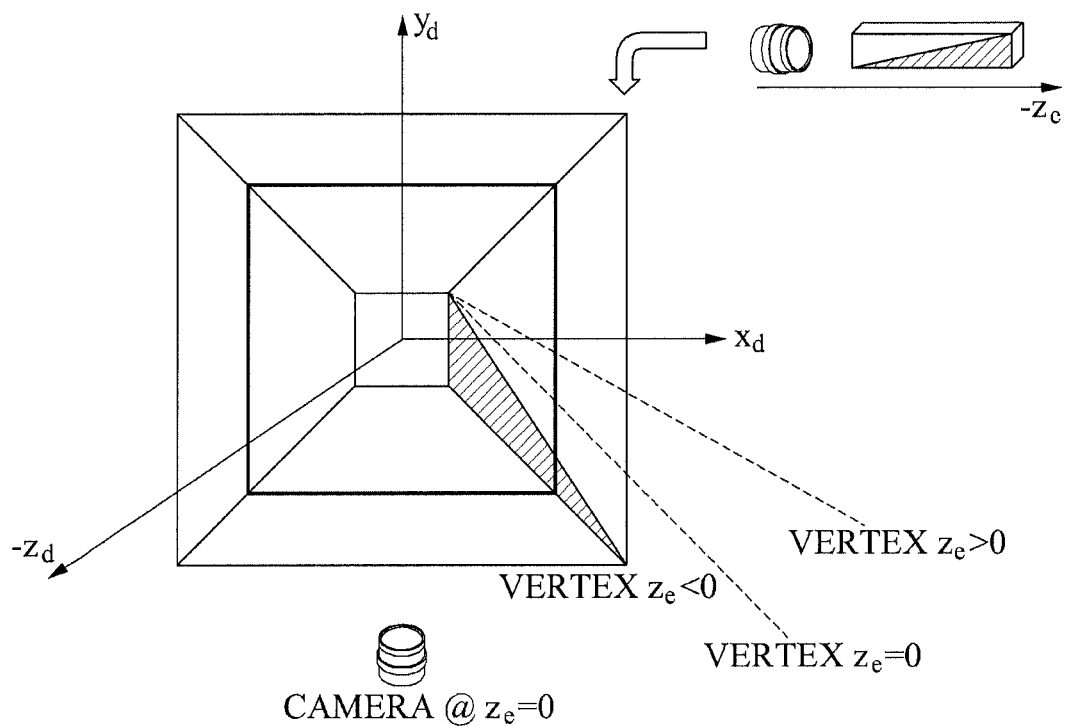
FIG. 4 illustrates an example of distance information of a triangular object when a perspective projection scheme is applied according to example embodiments.

FIG. 4 illustrates an example of distance information of a triangular object when a perspective projection scheme is applied according to example embodiments.

In FIG. 4, $Z_e=0$ may correspond to a viewpoint, and a value may decrease along a front side, in a viewpoint direction. Referring to FIG. 4, in a case of applying the perspective projection scheme according to Equation 1, a 2D location where the perspective projection scheme is applied may have an inaccurate value for $Z_e>0$.

In a case of applying the perspective projection scheme to a hexahedron based on the viewpoint, even through a shaded portion of the hexahedron, may maintain a triangular shape to have an accurate value for $Z_e<0$, the shaded portion of the hexahedron may not maintain the triangular shape for $Z_e>0$ or $Z_e=0$. Thus, in the case of applying the perspective projection scheme to the hexahedron, a clipping may be used to enable the shaded portion of the hexahedron to maintain the triangular shape.

Figure 5:
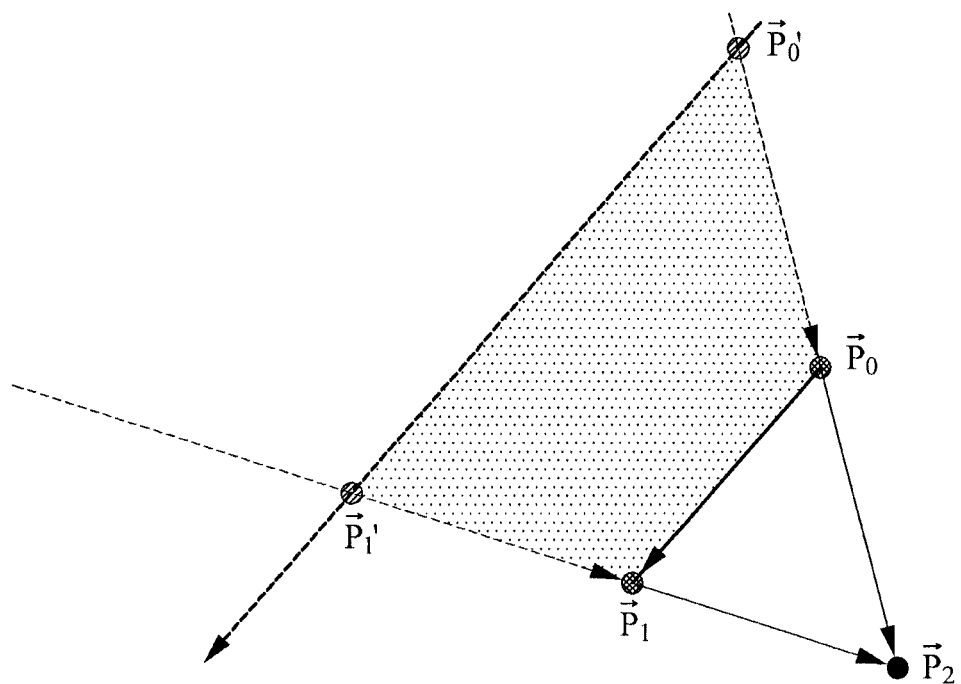
FIG. 5 illustrates a case where distance information of one vertex among vertices of a triangular object corresponds to a negative value according to example embodiments.

FIG. 5 illustrates a case where distance information $w_d$ of one vertex among vertices of a triangular object corresponds to a negative value according to example embodiments.

Referring to FIG. 5, a case where distance information $w_d$ of one vertex among three vertices of the triangular object corresponds to a negative value is illustrated. In this instance, three vertices configuring the triangular object may correspond to a result of applying a perspective projection scheme.

In a case where the distance information $w_d$ of vertex $\vec{P}_2$ among three vertices $\vec{P}_0$, $\vec{P}_1$, and $\vec{P}_2$ configuring the triangular object corresponds to a negative value, a shaded portion may correspond to a region using a 3D graphic rendering.

In this case, the vertex transforming unit 103 may generate two transformed vertices, by symmetrically transforming vertex $\vec{P}_2$ with respect to two remaining vertices $\vec{P}_0$ and $\vec{P}_1$, according to the following Equation 2.

[Equation 2]

$$\vec{P}_0{}' = (1-m)\vec{P}_2 + m\vec{P}_0$$

$$\vec{P}_1{}' = (1-m)\vec{P}_2 + m\vec{P}_1$$

Here, $\vec{P}_0{}'$ corresponds to symmetrically transformed vertex $\vec{P}_0$, and $\vec{P}_1{}'$ corresponds to symmetrically transformed vertex $\vec{P}_1$. "m" may indicate a predetermined natural number. In general, "m" may be a predetermined real number, and may preferably be a natural number so as to simply process an arithmetic operation.

The triangle resetting unit 104 may generate a rectangular object, including vertices $\vec{P}_0{}'$ and $\vec{P}_1{}'$ transformed according to Equation 2, and vertices $\vec{P}_0$ and $\vec{P}_1$, and may reset or convert four vertices of the rectangular object into two triangular objects sharing one side.

For example, the triangle resetting unit 104 may reset or convert the rectangular object to a triangular object, including vertices $\vec{P}_0{}'$, $\vec{P}_1{}'$, $\vec{P}_1$, and a triangular object including vertices $\vec{P}_0{}'$, $\vec{P}_0$, and $\vec{P}_1$ sharing line $\vec{P}_0{}'\vec{P}_1$. However, the triangle resetting unit 104 may not reset or convert the rectangular object to triangular objects having an overlapped region such as, a triangular object, including vertices $\vec{P}_0{}'$, $\vec{P}_1{}'$, and $\vec{P}_1$, and a triangular object including vertices $\vec{P}_1{}'$, $\vec{P}_0$, and $\vec{P}_1$.

Figure 6:
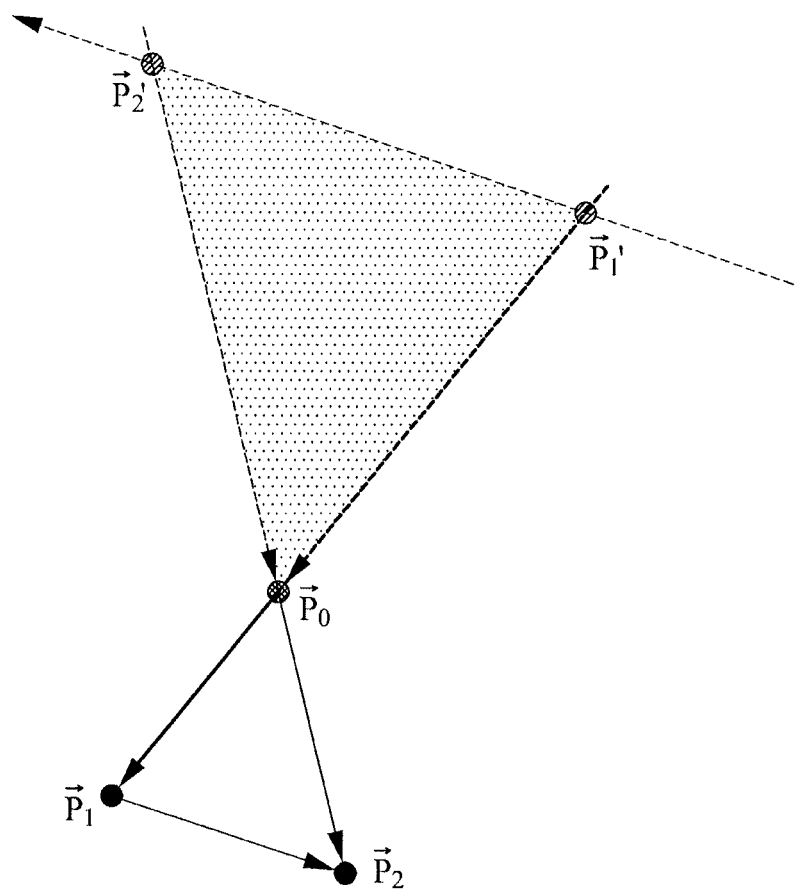
FIG. 6 illustrates a case where distance information of two vertices among vertices of a triangular object corresponds to a negative value according to example embodiments.

FIG. 6 illustrates a case where distance information $w_d$ of two vertices among vertices of a triangular object correspond to a negative value, according to example embodiments.

Referring to FIG. 6, a case where distance information $w_d$ of two vertices among three vertices, configuring a triangular object, correspond to a negative value is illustrated. In this instance, three vertices configuring the triangular object may correspond to a result of applying a perspective projection scheme. In a case where the distance information $w_d$ of vertex $\vec{P}_1$ and $\vec{P}_2$, among three vertices $\vec{P}_0$, $\vec{P}_1$, and $\vec{P}_2$, configuring the triangular object corresponds to a negative value, a shaded portion may correspond to a region using a 3D graphic rendering.

In this case, the vertex transforming unit 103 may symmetrically transform two remaining vertices $\vec{P}_1$ and $\vec{P}_2$ with respect to vertex $\vec{P}_0$, according to the following Equation 3.

[Equation 3]

$$\vec{P}_1{}' = (1-m)\vec{P}_1 + m\vec{P}_0$$

$$\vec{P}_2{}' = (1-m)\vec{P}_2 + m\vec{P}_0$$

Here, $\vec{P}_1{}'$ corresponds to a symmetrically transformed $\vec{P}_1$, and $\vec{P}_2{}'$ corresponds to a symmetrically transformed $\vec{P}_2$. "m" may indicate a predetermined natural number. In general, "m" may have a predetermined real number, and may preferably have a natural number so as to simply process an arithmetic operation.

The triangle resetting unit 104 may reset or convert the triangular object to a triangular object including vertex $\vec{P}_0$ and vertices $\vec{P}_1{}'$ and $\vec{P}_2{}'$ transformed according to Equation 3.

In a case where distance information $w_d$ of all vertices of a triangular object, where the perspective projection scheme is applied, corresponds to a positive value, an erroneously generated pixel may not exist even through a clipping process is not performed for the triangular object. In a case where distance information $w_d$ of all vertices of a triangular object, where the perspective projection scheme is applied, corresponds to a negative value, the triangular object may correspond to an object located out of a view-frustum and thus, the triangular object may not use a clipping process and may be excluded from the rendering process.

FIG. 7 illustrates a clipping method according to example embodiments.

In operation S701, a clipping apparatus may calculate distance information $w_d$ of three vertices configuring a triangular object. In this instance, the three vertices may correspond to a result of applying a perspective projection scheme to the triangular object, and the distance information $w_d$ may indicate a distance from a viewpoint.

In operation S702, the clipping apparatus may determine whether the distance information $w_d$, of all of the three vertices configuring the triangular object, corresponds to a negative value. When the distance information $w_d$ of all of the three vertices corresponds to a negative value, the clipping apparatus may not perform a clipping. In contrast, in a case where the distance information $w_d$ of all of the three vertices does not correspond to a negative value, that is, in a case where at least one of the distance information $w_d$ of at least one vertex corresponds to a positive value, the clipping apparatus may determine whether the distance information $w_d$ of the at least one vertex corresponds to a negative value in operation S703.

In a case where distance information $w_d$ of one vertex among three vertices configuring the triangular object corresponds to a negative value, the clipping apparatus may symmetrically transform the vertex, having negative distance information $w_d$ with respect to two remaining vertices, to generate two transformed vertices in operation S704. In operation S705, the clipping apparatus may generate a rectangular object with two remaining vertices and two generated vertices. Thereafter, in operation S706, the clipping apparatus may reset or convert the rectangular object to two triangular objects sharing a single side.

In operation S707, the clipping apparatus may determine whether distance information $w_d$ of two vertices among three vertices, configuring the triangular object, corresponds to a negative value. In a case where the distance information $w_d$ of two vertices corresponds to a negative value, the clipping apparatus may symmetrically transform two vertices, having negative distance information $w_d$ with respect to one remaining vertex, in operation S708. In operation S709, the clipping apparatus may reconfigure a triangular object with one remaining vertex and two symmetrically transformed vertices. In operation S710, the clipping apparatus may provide a rasterizer with data, with respect to the triangular object, reconfigured in operations S706 and S709.

The clipping method according to the above-described embodiments may be recorded in non-transitory computer-readable media including program instructions to implement various operations embodied or performed by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A clipping apparatus for resetting a triangular object for a three-dimensional (3D) graphic rendering, the apparatus comprising:
   a distance information calculator configured to calculate distance information for each vertex configuring the triangular object;

a vertex transformer configured to symmetrically transform a first vertex having negative distance information among three vertices of the triangular object with respect to a second vertex having positive distance information based on a status indication of the distance information for the three vertices, to generate a transformed vertex which is located on a virtual extending line formed based on the first vertex and the second vertex; and wherein a distance from the transformed vertex to the first vertex along the virtual extending line is greater than a distance from the first vertex to the second vertex; and wherein the transformed vertex has positive distance information; and a triangle converter configured to convert the triangular object based on the transformed vertex, wherein the distance information indicates depth information corresponding to a distance from a viewpoint to a location of a vertex in the 3D space before a perspective projection.

2. The apparatus of claim 1, wherein the distance information calculator calculates the distance information from the viewpoint with respect to each vertex of a triangular object where a perspective projection scheme is applied.

3. The apparatus of claim 1, wherein, in a case where distance information of one vertex among three vertices of the triangular object corresponds to a negative value, the vertex transformer symmetrically transforms the vertex having the negative distance information with respect to two remaining vertices to generate two transformed vertices.

4. The apparatus of claim 3, wherein the triangle converter generates a rectangular object having the two remaining vertices and the two transformed vertices, and converts four vertices of the rectangular object into two triangular objects sharing one side.

5. The apparatus of claim 1, wherein, in a case where distance information of two vertices, among three vertices of the triangular object, corresponds to a negative value, the vertex transformer symmetrically transforms the two vertices with respect to one remaining vertex to generate two transformed vertices.

6. The apparatus of claim 5, wherein the triangle converter converts the triangular object into a triangular object having one remaining vertex and the two transformed vertices.

7. The apparatus of claim 1, wherein the vertex having negative distance information indicates a vertex located in a rear side of the viewpoint in the viewpoint direction.

8. The apparatus of claim 1, wherein the vertex transformer symmetrically transforms the first vertex with respect to the second vertex when distance information of one vertex among the three vertices is a negative value or when distance information of two vertices among the three vertices are negative values.

9. A clipping method for resetting a triangular object for a three-dimensional (3D) graphic rendering, the method comprising:

calculating distance information for each vertex configuring the triangular object;

symmetrically transforming a first vertex having negative distance information among three vertices of the triangular object with respect to a second vertex having positive distance information based on a status indication of the distance information for the three vertices, to generate transformed vertex which is located on a virtual extending line formed based on the first vertex and the second vertex; and wherein a distance from the transformed vertex to the first vertex along the virtual extending line is greater than a distance from the first vertex to the second vertex; and wherein the transformed vertex has positive distance information; and converting the triangular object based on the transformed vertex, wherein the distance information indicates depth information corresponding to a distance from a viewpoint to a location of a vertex in the 3D space before a perspective projection.

10. The method of claim 9, wherein the calculating comprises calculating the distance information from the viewpoint with respect to each vertex of a triangular object where a perspective projection scheme is applied.

11. The method of claim 9, wherein, in a case where distance information of one vertex among three vertices configuring the triangular object corresponds to a negative value, the transforming comprises symmetrically transforming the vertex having the negative distance information with respect to two remaining vertices to generate two transformed vertices.

12. The method of claim 11, wherein the converting comprises generating a rectangular object having the two remaining vertices and the two transformed vertices, and converting four vertices of the rectangular object into two triangular objects sharing one side.

13. The method of claim 9, wherein, in a case where distance information of two vertices, among three vertices configuring the triangular object, corresponds to a negative value, the transforming comprises symmetrically transforming the two vertices with respect to one remaining vertex to generate two transformed vertices.

14. The method of claim 13, wherein the converting comprises converting the triangular object into a triangular object having one remaining vertex and the two transformed vertices.

15. A non-transitory computer-readable medium comprising a program for instructing a computer to perform:

calculating distance information for each vertex configuring the triangular object;

symmetrically transforming a first vertex having negative distance information among three vertices of the triangular object with respect to a second vertex having positive distance information based on a status indication of the distance information for the three vertices, to generate a transformed vertex which is located on a virtual extending line formed based on the first vertex and the second vertex; and wherein a distance from the transformed vertex to the first vertex along the virtual extending line is greater than a distance from the first vertex to the second vertex; and wherein the transformed vertex has positive distance information; and converting the triangular object based on the transformed vertex, wherein the distance information indicates depth information corresponding to a distance from a viewpoint to a location of a vertex in the 3D space before a perspective projection.

16. A method, comprising:

determining if a part of a triangle structure of a 3D object of a 3D scene projects outside a view frustum when the object is perspectively projected onto a 2D view plane;

creating one or more vertices along edges of the triangle structure that intersect the frustum to cut the triangle structure along a frustum edge forming a clipped structure; and converting the clipped structure into triangles when the clipped structure is not a triangle, wherein the one or more vertices along edges is generated by symmetrically transforming a first vertex having negative distance information among three vertices of the triangular object with respect to a second vertex having positive distance information based on a status indication of the distance information for the three vertices wherein the one or more vertices along edges is located on a virtual extending line formed based on the first vertex and the second vertex, wherein a distance from the transformed vertex to the first vertex along the virtual extending line is greater than a distance from the first vertex to the second vertex; and wherein the transformed vertex has positive distance information;

wherein the distance information indicates depth information corresponding to a distance from a viewpoint to a location of a vertex in the 3D space before a perspective projection.

* * * * *